United States Patent
Spalka et al.

(10) Patent No.: US 8,605,899 B2
(45) Date of Patent: Dec. 10, 2013

(54) METHOD FOR PROVIDING CRYPTOGRAPHICAL KEY PAIRS

(75) Inventors: Adrian Spalka, Koblenz (DE); Jan Lenhardt, Koblenz (DE)

(73) Assignee: Compugroup Medical AG, Koblenz (DE)

( * ) Notice: Subject to any disclaimer, the term of this patent is extended or adjusted under 35 U.S.C. 154(b) by 67 days.

(21) Appl. No.: 13/256,412

(22) PCT Filed: Mar. 4, 2010

(86) PCT No.: PCT/EP2010/052746
§ 371 (c)(1),
(2), (4) Date: Nov. 22, 2011

(87) PCT Pub. No.: WO2010/105915
PCT Pub. Date: Sep. 23, 2010

(65) Prior Publication Data
US 2012/0087494 A1   Apr. 12, 2012

(30) Foreign Application Priority Data

Mar. 20, 2009   (DE) .................... 10 2009 001 718

(51) Int. Cl.
*H04L 29/06* (2006.01)
(52) U.S. Cl.
USPC .......................................................... 380/46
(58) Field of Classification Search
USPC .................................................... 380/30, 44
See application file for complete search history.

(56) References Cited

U.S. PATENT DOCUMENTS

| | | | | |
|---|---|---|---|---|
| 6,230,269 | B1 * | 5/2001 | Spies et al. ................... | 713/182 |
| 2002/0021810 | A1 * | 2/2002 | Solinas ........................ | 380/278 |
| 2009/0006860 | A1 * | 1/2009 | Ross ............................ | 713/189 |
| 2009/0041249 | A1 * | 2/2009 | Tanaka et al. ................ | 380/277 |

FOREIGN PATENT DOCUMENTS

| | | |
|---|---|---|
| DE | 101 34 489 A1 | 1/2003 |
| DE | 10 2004 044892 A1 | 3/2006 |
| DE | 10 2004 063962 A1 | 6/2006 |
| EP | 1 105 998 A1 | 6/2001 |
| WO | WO00/72504 A1 | 11/2000 |
| WO | WO2008/059475 A1 | 5/2008 |

* cited by examiner

*Primary Examiner* — Jason Gee

(57) ABSTRACT

The invention relates to a method for creating a second asymmetric cryptographic pair of keys ($206$), wherein a first private key ($G_0$, $154$) together with a first public key ($O_0$, $126$) forms a first asymmetric cryptographic pair of keys ($K_0$, $218$), wherein the method comprises the following steps: receiving a user identifier; calculating a second private key ($G_1$), wherein a random value ($z$) and the user identifier are considered in the calculation; calculating a second public key ($O_1$) from the second private key using an asymmetric cryptographic key creation method, wherein the second private key and the second public key form the second asymmetric cryptographic pair of keys ($K_1$, $206$); creating a first ciphertext ($C\_G_0\_O_1$, $212$; $186$) by encrypting the first private key ($G_0$) with the second public key ($O_1$); storing the first ciphertext ($C\_G_0\_O_1$, $212$; $186$).

19 Claims, 4 Drawing Sheets

METHOD FOR PROVIDING CRYPTOGRAPHICAL KEY PAIRS

The invention relates to a method for generating asymmetric cryptographical key pairs, a method for decrypting data and also data processing systems and computer program products.

Chip cards are today used in diverse forms for encrypting and decrypting data. A field of application for chip cards is what is known as the electronic health card, which is intended to replace the health insurance card in Germany in future. The aim of this is to make data transmission between medical service providers, health insurance companies, pharmacies and patients less expensive in future, simplify it and to speed it up. This also includes allowing access to an electronic doctor's letter, an electronic patient record and an electronic prescription, inter alia, using the electronic health card.

It is therefore possible for medical data objects (MDOs), such as an electronic doctor's letter, an electronic patient record or an electronic prescription, to be stored on a central server in encrypted and digitally signed form. In this case, encryption is preferably performed using a symmetric key which is generated at random individually for each new medical data object in an electronic patient record, such as an electronic doctor's letter or an electronic prescription. The symmetric key itself, once created, is encrypted, for example with a public key from an asymmetric cryptographical key pair, and is stored on the central server together with the encrypted medical data objects. This public key used for encryption forms a cryptographic asymmetrical key pair together with a private key, which is stored on the electronic health card.

This ensures that access to the encrypted medical data objects is possible exclusively using the secret health card key. In the event of such access, the encrypted symmetric key is first of all decrypted using the secret health card key, and the decrypted symmetric key can then be used for further decryption of the medical data object. If creation of an MDO also involved a digital signature being generated with the secret health card key, it is subsequently possible to verify the integrity of the MDO and the authenticity of the MDO generator using the digital signature.

By way of example, DE 10 2004 051 269 B3 discloses a method for storing data and for querying data and also appropriate computer program products. A personalized chip card allows an electronic patient record to be stored on a data server. Using the chip card, it is possible for data, such as an MDO, in a patient record to be encrypted by a practice EDP system at a doctor's practice and to be transmitted to a data server in digitally signed form.

A further application for chip cards for patient data is known from DE 102 58 769 A1.

WO 00/72504 A1 describes a method for creating a cryptographic key pair comprising a public key and a private key. The private key can be restored or found out from the public key. This is done by virtue of a third party needing to authenticate itself prior to the private key being derived, so that there is no longer a need to store the private key separately from the public key.

EP 1105998 B1 describes a method for generating an asymmetric cryptographical key pair. Said method involves a starting value, which is input by a user, being used to generate a secret communication key. The secret communication key is used for communication with a previously ascertained asymmetric key pair comprising a secret key and a public key.

WO 2008/059475 A1 describes a method for generating a cryptographic key. The method allows secure interchange of data between a first and a second appliance. Both appliances have access to a secret (secret data record or piece of information which is not known to third parties). The second appliance has stored a cryptographical key which is derived in part from the secret. Using this key in a one-way function, the second appliance derives a text which can be used to find out the key again, the first appliance being capable of receiving the text and decrypting it using the secret which is known to the first appliance.

For the use of the electronic health card, the problem arises that in the event of a change of health insurance company and the associated issue of a new electronic health card with corresponding new asymmetric key pairs, for example, trouble-free access to an electronic patient record which has previously been encrypted using the old electronic health card is no longer possible. This means that the issue of a new electronic health card requires "recoding" of the old electronic patient record, which is intensive in terms of time and resources, particularly in the case of relatively large volumes of data.

A similar problem arises when an electronic health card is lost, and this even results in access to the electronic patient record no longer being possible at all on account of the cryptographic key pairs of the patient now no longer being available.

In order to counter loss of cryptographical key pairs, DE 101 34 489 B4 proposes an asymmetric cryptography method which uses recovery certificates and what are known as recovery cards to propose encrypting the secret key of a computer device with keys from at least two different recovery computer devices and creating an appropriate number of recovery certificates which have the encrypted key. This allows the secret key to be recovered and used without it being available in plain text outside of the smartcard.

By contrast, the invention is based on the object of providing an improved method for generating cryptographical key pairs, an improved method for encrypting data and also improved computer program products and improved data processing systems.

The objects on which the invention is based are each achieved by means of the features of the independent patent claims. Preferred embodiments of the invention are specified in the dependent patent claims.

The invention provides a method for generating a second asymmetric cryptographical key pair and a first asymmetric cryptographical key pair, wherein a first private key forms the first asymmetric cryptographical key pair together with a first public key, wherein the method comprises the following steps:

reception of an arbitrarily selectable user identifier, calculation of a second private key, wherein a random value and the user identifier are used in the calculation, calculation of a second public key from the second private key using an asymmetric cryptographical key generation method, wherein the second private and the public authorization key form the second asymmetrical cryptographical key pair, generation of a first cipher by encrypting the first private key with the second public key, and storage of the first cipher.

The method is therefore made up of two essential components, namely firstly the feature that a second asymmetric cryptographical key pair is generated which allows access to the first private key by virtue of storage of the first cipher. In other words, it is therefore possible to access the first private key either using the first asymmetrical cryptographical key pair, in the case of which the first private key is available in plain text. Alternatively, it is possible to decrypt the cipher with the second private key from the second asymmetric cryptographical key pair in order to obtain the first private key. Preferably, data are encrypted using the first public key, as a result of which it is possible to access these data using two different asymmetric cryptographical key pairs. This principle can be extended to a multiplicity of different key pairs which are each referred back to the first asymmetric key pair by means of appropriate ciphers. A user is therefore capable of using different key pairs in his possession to access his data objects and to decrypt them, with it not being necessary to store the same data objects more than once, encrypted with different cryptographical keys of the user. Furthermore, this allows the user to add further key pairs subsequently, these allowing the encrypted data objects to be accessed in the same way as with previously existing key pairs. This avoids recoding the encrypted data objects already stored in the information system.

The second feature of the present invention comprises the following steps:
1. Reception of an explicit user identification id and of an arbitrarily selectable user identifier pw associated with the user identification.
2. Mapping of the user identifier onto a value by a function g. The function g may be the identity function or a nontrivial function. From the point of view of security and confidentiality, g is preferably chosen as a collision-free one-way function, such as a cryptographical hash function.
3. Generation of a random value z.
4. Calculation of the second private key by applying a function f to g (user identifier) and z. By way of example, g (user identifier), i.e. the result of the application of the function g to the user identifier, and z are linked to one another and the function f is applied to the result of this concatenation. By way of example, f may be a cryptographical hash function which is applied to the concatenation of the hash value of the user identifier and the random value z.
5. Calculation of the second public key from the second private key, wherein the further second private and public keys form an asymmetric cryptographical key pair. By way of example, it is possible:
   for the second public key, which is a point on the elliptic curve, to be calculated for elliptic curves by multiplying the second private key, which is an integer, by the base point from the domain parameters.
   for the second public key (an integer) to be calculated for RSA such that it satisfies a congruence relationship, defined in the RSA method, with the second private key (likewise an interchange).

Embodiments of the invention have the advantage that in this case it is possible to generate asymmetric cryptographical key pairs, this being done using an arbitrarily selectable user identifier. The user identifier itself is used in the calculation algorithm for the second private and public keys.

It should be noted that "secret key" and "private key" are each notionally understood to mean the same key.

By way of example, the cited method steps allow a user to obtain access to an information system with data objects which have been encrypted using the first asymmetric cryptographical key pair, without the user needing to have this key pair available, for example on a chip card. By way of example, circumstances could require the user to obtain access to his data in an environment in which the requisite infrastructure for the operation of smartcards (card reader, etc.) is not available. The use of his self-selected user identifier nevertheless enables the user to generate his asymmetric cryptographical key pair even without a chip card, so as to obtain access to his encrypted data objects. In this case, the second cryptographical key pair can be deduced from a username/password combination, as a result of which the user is able to use a web interface, for example, to access the same data objects with the same scope of functions as when using a smartcard on which the second asymmetric cryptographical key pair was stored.

It should be pointed out that this method for generating an asymmetric cryptographical key pair differs from popular key generation methods in which, on the basis of today's prior art, it is merely possible to associate an arbitrarily selectable user identifier with an associated generated cryptographical key pair, but not to perform a functional calculation of key pairs using the arbitrarily selectable user identifier itself, which dispenses with the permanent storage of the association between the user identifier and the key.

These standard methods involve an arbitrarily selected user identifier or a depiction thereof being stored in a table and being explicitly associated with public or private keys, wherein merely administrative and/or legal regulations stipulate that unauthorized persons cannot access the private key. This practice compromises security to a significant degree: if an unauthorized person or else a government agency, on the basis of various monitoring laws, obtains access to the database which associates the passwords with the public and private keys, the person or organization is immediately able to access all the data objects of a person by accessing this single key-managing institution.

Hence, the method for generating an asymmetric cryptographical key pair has the further advantage that, in addition to the option of an arbitrarily selectable user identifier, it is not possible for a central entity to gain possession of the combination of user identifier (e.g. password) and key pairs, which ensures technical protection against seizure. The second private key can be calculated only with knowledge of a random value and the use identifier. Generation of the second public key likewise requires knowledge of the random value and the user identifier, the user identifier preferably being known exclusively secretly to the relevant user. By way of example, it is therefore no longer possible to obtain access to cryptographical key pairs and hence to encrypted data by means of seizure or theft of central database servers without the active assistance of those persons who are in possession of their private, secret user identifiers.

A further advantage of the method according to the invention is that, even when the same user identifier is selected by different users, the use of the random value for generating the further second private key means that it is possible to ensure that the said key pair is never allocated to different users.

It should also be pointed out that embodiments of the method according to the invention for generating an asymmetric cryptographical key pair could be applied to arbitrary cryptosystems for generating asymmetric key pairs, such as the RSA, Rabin and Elgamal cryptosystems or cryptographical methods on elliptic curves. From the second private key, which has been obtained on the basis of the user identifier and the random value, the second public key is calculated, such a method being able to be used for this calculation.

In this regard, it may be necessary for the second private key to need to have one or more prescribed properties and/or to need to satisfy conditions which are checked in the course of an admissibility check. If the further first key is found to be inadmissible for a selected method, a new random value is generated in order to produce a new candidate for a second private key, which is then in turn subjected to an admissibility check. This is repeated until an admissible second private key has been found. This admissibility check may involve the use of restrictions which arise directly from the algorithm for performing an appropriate asymmetric cryptographical key generation method.

Furthermore, it is also possible for further restrictions to be used in the admissibility check which relate, by way of example to the entropy of the generated key or which arise from current knowledge regarding the attackability of the relevant key generation method. By way of example, for the RSA method there are a series of generally known and regularly complemented restrictions, compliance with which is demanded for key generation by authorities in order to minimize the attackability of the generated key pairs. By way of example, PKCS#1 (Public Key Cryptography Standards) specifies a series of cryptographical specifications for RSA which need to be complied with by public and private RSA key pairs. The standard PKCS#13, which is under development, will stipulate the requirements for key generation on elliptic curves.

One aspect of the invention is that the second private key is calculated using a function g, applied to the user identifier pw. In accordance with one embodiment, either the arbitrarily selectable user identifier as such is received and then converted using the function g, or the function value g(pw) is received directly.

Calculation of the second private key using the value b=g(pw) and the random value z has the advantage that relatively unsecure user identifiers can therefore be used to calculate input values which have a high degree of randomness and therefore effectively increase the security of the second private key further when it is calculated. By way of example, the cryptographical hash function SHA-256 is applied for g.

In accordance with a further embodiment of the invention, the second private key is calculated by applying a function f to the values b and z. By way of example, f may be defined as the application of the cryptographical hash function SHA-256 to the concatenation, that is to say consecutive attachment, of b and z.

Applying the function f to the random value z and the function value g(pw) ensures a high level of quality for the second private key. In other words, the second private key likewise has a high degree of randomness on account of the random selection of z, so that guessing the second private key is therefore rendered practically impossible.

In accordance with one embodiment of the invention, the key pair for a cryptosystem is calculated on elliptic curves. An elliptic curve is provided by the equation $y^2=x^3+ax+b$, where the parameters a and b, and also the coordinates of the points (x, y) on the curve, are integers from the range [0, n−1], where n is the order of the curve. The values a, b, n and also a selected curve point P form what are known as the domain parameters of the elliptic curve, which also need to be disclosed for the purpose of performing cryptographical methods using the further first and further second keys. The number of points which satisfy the equation for an elliptic curve is referred to as the order n of the curve. The second private key is a natural number, and the second public key, a point on the curve, is the result of multiplication of the second private key by the curve point P on the elliptic curve.

The use of a cryptosystem on elliptic curves has the following advantages:
  the second private key may be an arbitrary natural number from the range [2, n−1]. This number is not tied to any further functional conditions; the aspect of its arbitrary nature will play a large part in due course.
  cracking a cryptosystem on elliptic curves is very highly complex, much more so than in the case of RSA.
  the keys are very short in comparison with RSA, and the calculations on the curve are relatively simple, which means that they can be implemented in a versatile and efficient manner.
  the second public key can be calculated from the second private key again easily and at any time.

Using the functions f and g, the second private key can be calculated very efficiently from the user identifier and the random value. This allows mathematical functions to be used to associate the cryptographical key pair with the selected user identifier. On account of this functional relationship, it is not necessary in this case to have available a tabular association between key pair and an appropriate user identifier.

In accordance with a further embodiment of the invention, the method comprises the step of checking the admissibility of the second private key. In the course of the admissibility check, a check is performed to determine whether the second private key is greater than 1 and less than the order of the elliptic curve. If this check condition is satisfied, the random value and also the second private and the second public key are admissible. If the check condition is not satisfied, however, a new random value is selected which is used to recalculate the second private key and to re-perform the admissibility check on this key. This process is repeated until the admissibility check is passed.

The admissibility check can be extended by further check conditions, e.g. by the check that the second private key has a high degree of randomness. In this regard, it should be noted that cryptography usually involves the use of algebraic structures which contain only a finite number of elements. The reason for this is that in the case of a finite number of elements, many problems which are harmless in real numbers become difficult, as a result of which elliptic curves with a finite number of elements can be used effectively for cryptographical applications. For cryptographical applications, it is now important that the algebraic structure used is large enough, that is to say that the number of points on an elliptic curve, referred to as the order, is sufficiently large. In this context, it is necessary to consider that the generated second private key may be larger than the order of the elliptic curve. So as nevertheless to allow an association in this case, it is customary to divide the second private key modulo the order of the elliptic curve. However, this results in a high level of probability that the resulting number is in a lower value range from the range [2, r−1] (where r is the order of the elliptic curve) or is even 0 or 1, as a result of which this reduces the difficulty of finding out a point on the curve which is situated in this value range mathematically or by trial and error. Performance of the admissibility check therefore reliably avoids restricting the value range which contains the second private key, which means that the entropy of the second private key and hence the randomness thereof can therefore be ensured to a sufficient extent.

A further advantage of the admissibility check is that it can be used to ensure that compatibility of the second private key with appropriate program libraries for elliptic curves, as are available on the basis of the prior art, can be reliably guaranteed.

At this juncture, it should be pointed out that performance of the admissibility check is not absolutely necessary for performing the method using an elliptic curve function. Even without applying the admissibility check, it is possible in this case to generate key pairs which, however, sometimes—depending on the user identifier and the random value—cannot take account of very high security demands which might be required for cryptographical applications. In the case of elliptic curves, the admissibility check is a further step in order to ensure that the generated key pairs satisfy those very security demands.

In accordance with one embodiment of the invention, the bit length of the random value is greater than or equal to the bit length of the order of the elliptic curve. Furthermore, in accordance with one embodiment of the invention, the random value is selected such that the value of the generated second private key is smaller than the order of the elliptic curve. Both criteria likewise have, as already discussed for the admissibility check, the same effect, namely that a high level of entropy for the second private key can therefore be ensured. Hence, in other words, the security of the second private key and hence the security of the encryption method are increased significantly.

In accordance with one embodiment of the invention, the key pair is calculated for an RSA cryptosystem. An RSA cryptosystem is provided by a number n, which is the product of two prime numbers p and q ($n=p \cdot q$), the number d, which satisfies the condition $HCF(d(p-1) \cdot (q-1))=1$, and the number e, which satisfies the condition $e \cdot d \equiv 1 \mod(p-1) \cdot (q-1)$ ("HCF" stands for highest common factor). Following the selection of d and the calculation of e, the values p,q and $(p-1) \cdot (q-1)$ need to be deleted. Which of the two e and d is the public key and which is the private key can be selected freely, in principle, in the case of RSA; in this invention, the functions f and g calculate the second private key d from the user identifier pw and the random value z. The extended Euclidian algorithm is then used to calculate the second public key e from the second private key d.

The advantages of the RSA method are the facts that the method continues to be very secure with keys selected to be of appropriate length and that it is in widespread use. However, RSA also has the drawbacks that it is slow in operation on account of the requisite long key length, and modern factorization algorithms give rise to the fear that RSA will be cracked in the not too distant future.

For RSA too, the functions f and g allow the second private key to be calculated from the user identifier and the random value. Hence, it is also possible for RSA to allocate a cryptographical key pair to the selected user identifier using mathematical functions. On account of this functional relationship, it is not necessary to have available a tabular association between key pair and an appropriate user identifier for RSA either.

In accordance with a further aspect of the invention, the method comprises the step of checking the admissibility of the second private RSA key. The admissibility check involves a check to determine whether the second private key d satisfies the conditions d is in the range $[2,(p-1) \cdot (q-1)-2]$ and
$HCF(d, (p-1) \cdot (q-1))=1$ The admissibility check may contain further conditions based on current knowledge. When these check conditions are satisfied, the random value and the second private and second public keys are admissible. If the check condition is not satisfied, however, a new random value z is selected which is used to recalculate the second private key and to re-perform the admissibility check on this key. This process is repeated until the admissibility check is passed.

In accordance with a further embodiment of the invention, the random value is retrieved from a database, wherein the random value is explicitly associated with the user identification. By way of example, first performance of the method for generating the asymmetric key pair involves a random value being generated once by a trustworthy station, e.g. a certification station, which random value needs to be accessible to an appropriate user for cryptographical processes if the second private key is admissible. By storing the random value in a database, associated with the explicit user identification, it is possible, by way of example, for a computer program which executes the method for generating asymmetric key pairs to retrieve the random value via a secure communication link using the user identification and to use it to generate the relevant first and possibly also the further second public key.

Preferably, the random value is stored in the database in encrypted form. To this end, in accordance with one embodiment of the invention, symmetric encryption, e.g. using AES-256, can be used. The use of an encrypted random value has the advantage that it is therefore possible to prevent dictionary attacks for decrypting the first key by experiment.

In accordance with a further embodiment of the invention, the method also comprises the step of reception of a third private key, wherein the third private key forms a third asymmetric cryptographical key pair together with a third public key, and reception of a second cipher. In addition, the method comprises the decryption of the cipher with the third private key to obtain the first private key.

These steps are necessary when the first private key is not available in plain text, so as to generate the first cipher by encrypting the first private key with the second public key. This could be the case when the user identifier/random value principle is intended to be implemented for a user but the user does not have an appropriate chip card on which the first asymmetric cryptographical key pair is stored, so that the first cipher could be generated therefrom directly. In this case, it is assumed that a further, third asymmetric cryptographical key pair is available which has previously be used to generate an appropriate second cipher for the first private key. If this second cipher is now decrypted with the third private key, this results in the first private key, which can then be used for the password-protected generation of the first cipher.

In accordance with a further embodiment of the invention, the third private key is received from a portable data storage medium. It is therefore assumed in this case that the third private key is stored on an appropriate chip card. However, it is also possible for the third private key likewise to be derived by applying the password principle described above.

In accordance with a further embodiment of the invention, the method also comprises the step of authentication to the database on which the ciphers are stored, wherein the second cipher is received from the database following successful authentication.

This gives rise to multiple advantages: firstly, it is possible to ensure that only authorized persons are able to retrieve ciphers from the database in order to use them to calculate the first private key. By way of example, provision can be made in this case for exclusively authorized medical service providers to be able to access the ciphers in the case of encryption and decryption processes for medical data objects. If the data processing system of such a medical service provider is regarded as a trustworthy station, this station is capable of performing decryption processes for data objects using the first private key, to which end the first private key may be available in plain text in the main memory in the relevant data processing system. In this context, it is assumed that there is no misuse of the first private key in this case.

The concept of multiple key pairs in connection with ciphers which are stored on the database can therefore be extended flexibly by further criteria. By way of example, it is possible for a cipher to have an extended validity on the basis of time interval, an extended validity on the basis of number of uses or an extended validity on the basis of the nature of use:

validity on the basis of time interval: the server in the information system stores the time interval within which a key pair is valid. If a user attempts to use an "expired" key pair $K_i$, i.e. the user opens a session on the information system in which he authenticates himself with the key pair $K_i$, then the information system denies him this.

validity on the basis of number of uses: the server in the information system stores how often a key pair can be used as a maximum and how often it has already been used (i.e. how often a session has been opened using the key pair during authentication). If the number of uses of a key pair $K_i$ which has already taken place has reached its maximum number, the information system denies fresh use of $K_i$; the session is then thus not set up.

Validity on the basis of the nature of use: the server in the information system stores, for each key pair, which operations are admissible in a session which has been opened using the key pair during authentication. If the user attempts to perform an operation which is not admissible for the current session, the information system denies this.

In all these cases, it is assumed, as already described above, that the encryption and decryption processes for data and also the decryption processes for ciphers take place in a trustworthy station which does not store the cipher decrypted in a previous session, i.e. the first private key, in unauthorized fashion so as to be no longer reliant on use and access to further ciphers in future.

In accordance with a further embodiment of the invention, the method also comprises the step of generation of a fourth asymmetric cryptographical key pair, wherein a fourth private key forms the fourth asymmetric cryptographical key pair together with a fourth public key, wherein the method comprises the steps of reception of the fourth public key, generation of a fourth cipher by encrypting the first private key with the fourth public key, and storage of the fourth cipher. Preferably, these method steps are performed on a portable data storage medium, such as the portable data storage medium which contains the first asymmetric cryptographical key pair, which ensures that the first private key does not leave the portable data storage medium, such as a chip card.

It should be noted that asymmetric cryptographical key pairs can be stored generally on portable data storage media. Such portable data storage media may be chip cards, USB sticks, flash drives, portable hard disks. It is also possible to use portable data storage media with a processor, such as processor chip cards, i.e. what are known as smartcards, which are capable of performing decryption processes for ciphers themselves.

In accordance with a further embodiment of the invention, the method also comprises the step of reception of a key pair identifier associated with the asymmetric cryptographical key pair in the trustworthy station, wherein the cipher is retrieved using the key pair identifier. By way of example, the cipher is retrieved from a database. Alternatively, it is possible, by way of example, for the asymmetric key pair to be stored on a portable data storage medium, such as a chip card, together with the cipher.

In accordance with a further embodiment of the invention, the method comprises the step of a signature check on the data object encrypted with the first public key, wherein the signature check comprises the steps of reading a signature associated with the data object and verification of the signature for the data object, wherein the verification is performed with the second public key.

Performing an additional signature check in the event of the data object having previously been signed has the advantage that this can be used to verify that the data object has not been modified without authorization since the original encryption process.

In accordance with a further embodiment of the invention, the data object is encrypted with a symmetric data object key, wherein the symmetric data object key is encrypted with the first public key, wherein the decryption of the encrypted data object in this case comprises the further step of decryption of the encrypted symmetric data object key with the decrypted first private key and decryption of the encrypted data object with the decrypted symmetric key.

In accordance with a further embodiment of the invention, the random value is retrieved from a database via a secure communication link. In this case, it is possible for the database from which the cipher is retrieved and from which the random value is retrieved to be identical.

In accordance with a further embodiment of the invention, the random value is stored in the database in encrypted form.

In accordance with a further embodiment of the invention, the data object is a medical data object.

In a further aspect, the invention relates to a computer program product having instructions which can be executed by a processor for the purpose of performing the method according to the invention.

In accordance with one embodiment of the invention, the computer program products are produced by applets or browser plug-ins. It is likewise possible to provide the computer program products as independent applications for a data processing system. The use of an applet or a browser plug-in has the advantage that existing data processing systems do not need to be converted for the purpose of performing the method for key generation and consequently also for performing cryptographical operations such as encryption, decryption and the creation and verification of digital signatures: in this case, it merely suffices to load an applet, for example via the Internet, which can perform the described operations securely.

In a further aspect, the invention relates to a data processing system for generating a second asymmetric cryptographical key pair using an arbitrarily selectable user identifier.

In a further aspect, the invention relates to a method for decrypting data, wherein the data are encrypted with a first public key, wherein the method first of all comprises the step of reception of a first cipher, wherein the first cipher comprises a first private key encrypted with a second public key, wherein the first private key forms an asymmetric cryptographical key pair together with the first public key. This is followed by the reception of a user identifier and of a random value, wherein the random value is associated with the user identifier. By way of example, the user identifier can be provided by virtue of a keyboard input on a data processing system by a user. Next, a second private key is calculated, wherein the random value and the user identifier are used in the calculation, wherein the second private key and the second public key form a second asymmetric cryptographical key pair. The first cipher is then decrypted with the second private key to obtain the first private key. Finally, the data are decrypted with the first private key.

A user therefore has two selection options available for how the user wishes to decrypt his data encrypted with the first public key. In one option, the user is able to use his first private key, if he has it available, directly to decrypt the data.

By way of example, it is conceivable in this case for the first private key to be stored on a chip card belonging to the user, so that the user can perform data decryption using his chip card. An alternative available to the user is that he uses his user identifier to calculate a second private key, then retrieves a cipher associated with the second private key from an appropriate database and decrypts it so as to obtain the first private key, in order then in turn to perform a decryption process for his data. As already mentioned above, the latter alternative is advantageous particularly when an appropriate infrastructure for reading chip cards is not available. In this case, there is nevertheless the assurance that a user is able to access his encrypted data.

In a further aspect, the invention relates to a computer program product having instructions which can be executed by a processor for the purpose of performing the decryption method.

In a further aspect, the invention relates to a data processing system for decrypting data.

Preferably, the data processing system is a data processing system at a trustworthy station. This may be a certification station or a trust centre, for example. Alternatively, it is also possible to provide an appropriate piece of, preferably portable, hardware which, as a trustworthy station, comprises the data processing system. In a further alternative, the trustworthy station may be the client itself which performs the cryptographical operations. Finally, it is also possible for the data processing system to be a data processing system which runs on a separate, protected hardware module. In this case, it is possible for a trusted platform module (TPM) to be used, for example.

Embodiments of the invention are advantageous from different aspects: the invention allows the generation of an inverted tree which relates the key pairs to one another. This allows a lost key pair to be replaced by another key pair from the tree. In addition, this allows a very high degree of flexibility for adjusting and/or retrieving data objects. In particular, it is possible to access the data objects even when the owner of the keys currently does not have a computer or, on account of his physical constitution, for example, is unable to use a computer. In this regard, the owner is able to give his password to the doctor, for example, verbally, and the doctor then effects the access. In particular, this does not require the owner, i.e. the patient, to present or enable a chip card for this purpose.

It is of particular further advantage that a plurality of the key pairs can be used simultaneously, wherein a data object which has been encrypted with one of the key pairs can be decrypted with any of the other key pairs.

It is of particular further advantage that one or more of the key pairs can be provided with attributes which specify the opportunity for use of the relevant key pair, for example in respect of the validity period, the number of uses and/or the purpose of use.

Embodiments of the invention are explained in more detail below with reference to the drawings, in which.

Figure 1:
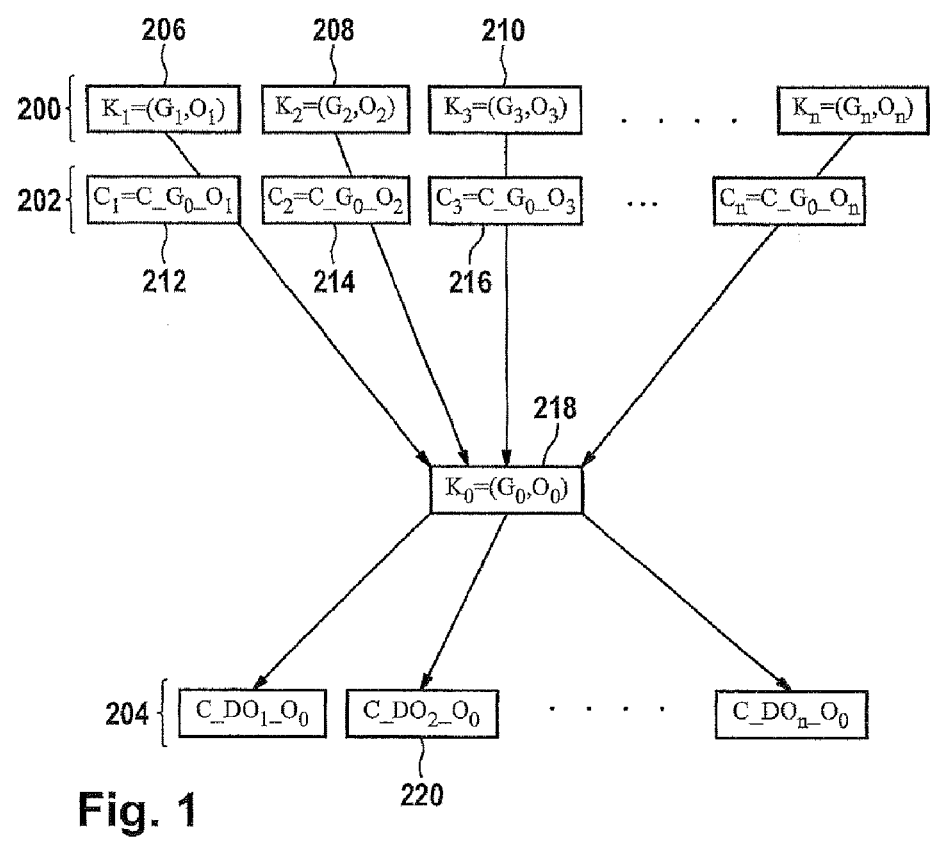
FIG. 1 shows a block diagram for key management.

FIG. 1 shows a block diagram for the management of different asymmetric cryptographical key pairs, subsequently referred to as $K_i$. Without restricting the general nature, it is subsequently assumed that the cryptographical key pairs under consideration are designed in accordance with a cryptosystem based on elliptic curves. In addition, the following designations apply:

Let $K_i = (G_i, O_i)$ where $i = 1, 2, 3, \ldots$ denote an asymmetric cryptographical key pair.

Let $G_i$ denote the secret key pair component or "the secret key" or "private key" of an asymmetric cryptographical key pair $K_i$.

Let $O_i$ denote the public key pair component or "the public key" of an asymmetric cryptographical key pair $K_i$.

Let $V_A(DO, O_i)$ denote an encryption function which is based on an asymmetric cryptosystem and which is performed on a data object DO using a public key $O_i$.

Let $C\_DO\_O_i = V_A(DO, O_i)$ denote a "cipher" of the result of the encryption function $V_A$, applied to the data object DO using the public key $O_i$.

Let $E_A(C\_DO\_O_i, G_i) = DO$ denote a decryption function which is based on an asymmetric cryptosystem and which is performed on an encrypted data object $C\_DO\_O_i$ using a secret key $G_i$. In this case, $G_i$ forms an asymmetric cryptographical key pair together with the public key $O_i$ used for the encryption of $C\_DO\_O_i$.

FIG. 1 first of all provides various key pairs 200, with key pairs $K_{1...n}$ being able to be used to decrypt ciphers 202 so as to extract the private key $G_0$ in each case. The key pair 218 $K_0 = (G_0, O_0)$ is in this case that key pair which has been used to encrypt various data objects $DO_n$. The encrypted data objects are subsequently identified by the reference symbol 204. It is therefore possible to perform a decryption process for one of the encrypted data objects 220 using the private key $G_0$ from the key pair 218, for example, directly. Alternatively, it is possible to use the private key $G_i$ from each of the key pairs 200 for the decryption. If the key pair 206 $K_1$ is used, for example, then the cipher 212 is first of all decrypted with the private key $G_1$ from the key pair 206, which produces $G_0$, which can be used to perform the decryption process for the data object 220.

A critical factor is therefore the linking of two asymmetric cryptographical key pairs, e.g. $K_0$ and $K_1$, which are designed in accordance with an arbitrary asymmetric cryptosystem.

In this case, the linking of the two key pairs 218 and 206, for example, is produced by virtue of the secret key $G_0$ from the key pair $K_0$ (218) being encrypted with the public key $O_1$ from the key pair $K_1$ (206), and the cipher 212, $C\_G_0\_O_1 = V_A(G_0, O_1)$ being stored publically.

The storage and retrievability of the cipher 212, $C\_G_0\_O_1$ produces a dependency between the key pairs $K_1$ and $K_0$: a user who is in possession of the secret key $G_1$ can therefore decrypt not only all the data objects encrypted with the associated public key $O_1$, but rather also the cipher 212 $C\_G_0\_O_1$, that is to say the encrypted secret key $G_0$ from the key pair $K_0$. The user can then use $G_0$ to also decrypt all data objects 204 encrypted with the public key $O_0$ from the key pair $K_0$.

The dependency between the two key pairs $K_1$ and $K_0$ which is produced as a result of the storage of the cipher 212, $C\_G_0\_O_1$, which is subsequently called a 1:1 dependency, can be represented as a directional graph in which the key pairs $K_1$ and $K_0$ are shown as nodes 218 and 206 of the graph and the publically stored cipher 212, $C\_G_0\_O_1 = V_A(G_0, O_1)$ is shown as the directional edge from $K_1$ to $K_0$ between the two nodes 206 and 218. The connection from $K_1$ to $K_0$ thus states that the cipher 212, i.e. $C_1 = C\_G_0\_O_1 = V_A(G_0, O_1)$ is stored publically and hence the secret key $G_0$ from the key pair $K_0$ is likewise accessible given possession of the secret key $G_1$ from the key pair $K_1$.

If the key pairs $K_0$ and $K_1$ are assumed, it may also be desired for a further asymmetric cryptographical key pair $K_2$ (208) to be added. In this case, the secret key $G_0$ from $K_0$ is encrypted with the public key $O_2$ from $K_2$, and the cipher 214, $C\_G_0\_O_2=V_A(G_0,O_2)$ is stored.

Hence, in this case the already existing 1:1 dependency from $K_1$ to $K_0$ has a further 1:1 dependency from $K_2$ to $K_0$ added, which means that a user can access the secret key $G_0$ from $K_0$ both when he is in possession of the secret key $G_1$ from $K_1$ and when he is in possession of the secret key $G_2$ from $K_2$. Further key pairs $K_2, K_3, \ldots, K_n$ are added to the scenario, with $K_0$ being dependent on every single one within the context of a 1:1 dependency.

In this scenario, it is possible to gain access to the secret key of a single key pair from different key pairs; this will be called N:1 dependency. FIG. 1 shows the graph of an exemplary N:1 dependency for the keys.

An application for the dependency hierarchy presented in FIG. 1 is the use within an information system which is accessed by various users in each case with different key pairs 206, 208, 210 which are in their possession and which stores data objects in encrypted form 204 for these users. This information system preferably has various demands made of it:

One demand is, as already mentioned, the accessibility of the data objects with different key pairs without multiple encryption of the data objects. The user must be capable of using different key pairs which are in his possession to access the information system and to decrypt his data objects, wherein this demand must not be resolved by virtue of multiple storage of the same data objects, encrypted with the different cryptographical keys of the user. Furthermore, it must be possible to add further key pairs to the information system subsequently for a user, said key pairs needing to allow access to the encrypted data objects in the same way as the previously existing key pairs. Recoding of the encrypted data objects already stored in the information system must be avoided in this case.

A further demand is the confidentiality of the data objects. For each user, the data objects of said user need to be stored in the information system with such encryption that only the user himself is able to decrypt the data objects; neither other users nor the operator of the information system must have access to the data objects. It follows from this that the data objects of the user need to be encrypted with a cryptographical key, part of which is a secret which is accessible only to the user, and this secret must at no time be accessible to another user and particularly to the operator of the information system.

Technical protection of the information system against seizure involves the aforementioned aspect, which states that the secrets of the users which are required for decrypting the data objects must not be accessible to the operator of the information system at any time, resulting in the operator of the information system at no time having the opportunity to access the data objects stored in the information system in encrypted form in plain text. Embodiments of the invention thus allow a patient, for example, to be provided with absolute data sovereignty over his medical data objects, since access to the data objects is technically impossible without the collaboration of the patient. The invention thus allows the sometimes legally existing protection against seizure to be extended by technical measures.

Such an information system is implemented by the hierarchic key management shown in FIG. 1. In this regard, for each user of the information system, a dependency hierarchy $H=(K,C)=(\{K_0, \ldots, K_n\}, \{C_1, \ldots, C_n\})$ in the form of a two-level inverted tree is added to the information system, in which a key pair $K_0$ is dependent on n further key pairs $K_1, \ldots, K_n$ via the dependency relationships $C_1, \ldots, C_n$. For each user B of the information system, all data objects DOi are encrypted, possibly indirectly, with the respective public key $O_0$ from the key pair $K_0$ of the user, and the ciphers, $C\_DOi\_O_0=V_A(DOi,O_0)$, particularly the cipher 220, for example, are stored in the information system.

When a data object which has previously been encrypted in this manner is retrieved, the user B wishing (or being forced) to use the secret key $G_i$ from the key pair $K_i$ for decryption at this time loads from the information system not only the cipher for the data object $C\_DO\_O_0$ but also the cipher $C\_G_0\_O_i$ for the secret key $G_0$—encrypted with the public key $O_i$ from the key pair $K_i$—from the key pair $K_0$, decrypts $G_0=E_A(C\_G_0\_O_i,G_i)$ and hence subsequently decrypts the data object $DO=E_A(C\_DO\_O_0,G_0)$.

The demands formulated above are therefore met in this information system. Since the secret key $G_0$ from the key pair $K_0$ (218) is stored in encrypted form for all key pairs from $K_1, \ldots, K_n$ (200) and can be retrieved, the data objects for a user can be decrypted with the secret key from each of his key pairs $K_1, \ldots, K_n$ (200). Multiple storage of the data objects, encrypted with the different key pairs of the user, is not necessary in this case.

It is equally possible to add to the information system a further key pair $K_{n+1}=(G_{n+1},O_{n+1})$ for a user without needing to open or recode one or more ciphers for the data objects of the user which are already stored in the information system. In this regard, only the secret key $G_i$ from one of the already existing key pairs $K_i \in \{K_1, \ldots, K_n\}$ needs to be used in order to decrypt $G_0=E_A(C\_C_0\_O_i,G_i)$, which can then be used to calculate the cipher $C\_G_0\_O_n+1=V_A(G_0,O_n+1)$, which is then stored publically in the information system. The user can use this new key pair to access both all previous data objects stored in the information system and all future data objects stored at some point in time in the information system, regardless of which key pair is used for adjusting the new data objects.

Furthermore, only the user himself can decrypt his own data objects, since only he is in possession of the secret keys $G_1, \ldots, G_n$ which are needed in order to decrypt the secret key $G_0$ from the key pair $K_0$ (218). In this case, $G_0$ only ever becomes accessible in plain text at the trustworthy station, e.g. in the doctor information system on which an encryption and decryption process for data objects is intended to take place. By contrast, the operator of the information system preferably has access, besides to the ciphers for the data objects, only to the ciphers $C\_G_0\_O_i$ from $G_0$, which he cannot decrypt without the secret keys $G_1, \ldots, G_n$, which are not in his area of access. Consequently, the technical protection against seizure is also implemented with this information system.

In this context, a "trustworthy station" is understood to mean any electronic appliance, such as a computer system, in which the data objects in need of protection are available in plain text and/or in which data for converting the data objects are available in plain text and/or which has access to such data.

One practical option for use of such N:1 key pair hierarchies in information systems is, as already mentioned, that the user can obtain access to the information system and his data objects contained therein normally using the cryptographical key pair $K_1$ (206), which is stored on a smartcard in the possession of the user. At the same time, however, circumstances may also require the user to obtain access to the information system in an environment in which the requisite infrastructure for the operation of smartcards (card reader, etc.) is not available, which means that the user has to have a second cryptographical key pair $K_2$ (208) which, in accordance with the present invention, can be derived from a username/password combination and which the user can use, for example via a web interface, to access the same data objects with the same scope of functions as when using the smartcard.

One conceivable example of this would be an electronic patient record, for example, which is in the possession of a user and which is stored online on a central computer. The demand for confidentiality and technical protection against seizure of the data objects stored in the information system would meet the high level of need for protection of medical data; no other unauthorized user, nor the record operator himself, would have access to the data objects of the user.

Furthermore, the user would have access to the data objects in his record usually with a smartcard, for example with his electronic health card; at the same time, however, it could be necessary for the user to obtain access to his medical data objects without using the smartcard, for example on vacation from a computer in an Internet café in which he can authenticate himself merely with a username and password.

In this scenario, the user would thus permanently have two different key pairs which could be used to access the same set of data objects to the same extent in each case. It is easily conceivable for the scenario to be extended to three or more key pairs which can be used to access data objects, likewise to the same extent in each case.

In addition, the concept of multiple key pairs can be extended by a time-based validity interval which is stored for each key pair in the information system. It is therefore possible for the validity of key pairs to have a time restriction added which is in the hands of the operator of the information system, as a result of which it is possible, by way of example, for the operator of the aforementioned electronic patient record to compel access which a user has acquired by means of a username and a password to be possible only over a particular period and no longer thereafter, for example so long as the user is on vacation and is reliant on the username/password access.

A further potential application for multiple instances of key pairs is data availability when a key pair has been lost. Instead of using the lost key pair, the encrypted data objects are accessed using one of the alternative key pairs. If, in the embodiment from FIG. 1, for example, the key pair $K_1$ has been lost, decryption can be performed using $K_2$, for example, instead of using $K_1$. The demand for confidentiality of the data objects within the information system, including technical protection of the information system against seizure, involves the information system operator not being able to be in a position to restore a lost key pair for the information system, i.e. the lost secret key from one of the key pairs of a user, for example when a smartcard has been lost or stolen, or when the user has forgotten the password for his username/password access. In order to be able to do this, the operator would in each case need to be able to store a copy of the secret key or to reconstruct it using secret sharing methods or the like, which would technically enable him to decrypt the data objects of the user, which in turn would be inconsistent with the aforementioned demand for technical protection against seizure.

The invention does not provide the option of restoring that secret key which has been lost; instead, however, the invention allows an equivalent key pair to be used which replaces the previous key pair that has become unusable as a result of the secret key having been lost.

In this regard, it should be noted that restoration does not correspond to the natural sequences of most scenarios anyway, since one never knows whether a lost key may be found and used by a third party. In this case, the validity of such a key pair needs to be withdrawn prematurely so that the use thereof henceforth has no damaging effect, which is achieved by making the lost key invalid.

To maintain data availability, each user of the information system has his N:1 dependency hierarchy H=(K,C) extended such that a cryptographical key pair $K_x$ is added to the set $K=\{K_0, K_1, \ldots, K_n\}$ of key pairs, and the set $C=\{C\_G_0\_O_1, \ldots, C\_G_0\_O_n\}$ is likewise extended by an element $C\_G_0\_O_x = E_A(G_0, O_x)$.

This new key pair $K_x$ and also the associated new 1:1 dependency from $K_x$ to $K_0$ (218) are technically equivalent to the key pair/1:1 dependency combinations contained in H; the difference is the intended semantics of $K_x$ and $C\_G_0\_O_x$, since these two elements are never used to access data objects, but rather are used exclusively to ascertain the secret key $G_0$ from the key pair $K_0$ in the course of creating a replacement for a lost key pair from $\{K_1, \ldots, K_n\}$.

If the user possessed only a single further key pair $K_1$ (206) besides $K_0$ (218), for example, and were to lose the secret key $G_1$ from $K_1$, he would no longer be able to decrypt the secret key $G_0$ from $C\_G_0\_O_1$; since the information system operator is also unable to reconstruct the secret key, all data objects belonging to the user in the information system would therefore be lost.

In this case, the new key pair $K_x$ and the associated new 1:1 dependency $C\_G_0\_O_x$ would become important and can be used to decrypt $G_0$ from $C\_G_0\_O_x$ instead of from $C\_G_0\_O_1$. As soon as $G_0$ is available to the user in plain text, he can generate new key pairs $K_i$ and also new 1:1 dependencies $C\_G_0\_O_i$, which he can use to access his data objects as usual.

It should be mentioned that if the user has at least one further combination of key pair and 1:1 dependency besides $K_0$, $K_1$ and $C\_G_0\_O_1$, he could use precisely this further combination to create new key pairs and 1:1 dependencies instead of $K_x$ and $C\_G_0\_O_x$, and that $K_x$ and $C\_G_0\_O_x$, strictly speaking, become relevant only for the rather improbable case in which the user loses the secret keys from all of his key pairs $K_1, \ldots, K_n$ at once. In view of the scope of the consequences of this scenario, namely the irretrievable loss of all the data objects of the user, the restoration key pairs are in fact warranted again.

A further variant of multiple key pairs is the use thereof as single-use key pairs, which is equivalent to TAN systems, for example, which are used in online banking. It would thus be possible to compel particular key pairs to be able to be used for only one session, which may be desirable in certain application scenarios.

To this end, a user of the information system would have declared, within the set of his own key pair/1:1 dependency combinations $\{(K_i, C\_G_0\_O_i)/i \in \{1, \ldots, n\}\}$, a subset of these combinations on a server as "single-use key pairs", which means that the 1:1 dependency component of these combinations, which are stored on the server in the information system, of course, are accordingly marked therein as being able to be used only a single time (an additional time-restricted validity for such key pairs could also make sense).

As soon as the user retrieves a cipher $C\_G_0\_O_i$ from the information system which is part of a single-use key pair set $(K_i, C\_G_0\_O_i)$, in order to calculate the secret key $G_0$ for the key pair $K_0$ therefrom, said cipher is deleted in the information system, so that the user cannot retrieve the value a second time and the associated key pair is useless.

As already mentioned, in respect of an access restriction for the encrypted data objects 204 and the ciphers 202, various access criteria or generally access management can be implemented. These may have a validity for key pairs $K_i$ on the basis of time interval, on the basis of number of uses or on the basis of the nature of use.

As an example, an electronic patient record may again be cited, in the case of which a user (a patient) grants another user (a doctor) an access right to his own record, but merely for a maximum of five instances of access to the record and in a time window of just one month; furthermore, the doctor is also permitted exclusively read access to the record of the patient. The patient thus generates a new key pair $K_p$, in the case of which the secret key $G_0$ from the key pair of the patient is encrypted with the public key $O_p$ of the doctor, and the cipher $C\_G_0\_O_p$ is stored publicly in the information system. This key pair is made available to the doctor by the patient.

A further option is generation of one of the key pairs $K_i$ with the username/password method disclosed herein, wherein the key pair $K_i$ is provided with an attribute. This attribute may be a restriction to the usability of the key pair $K_i$ in respect of the number of uses, the validity period and/or the access rights for particular instances of the data objects.

By way of example, the key pair $K_i$ may be in the form of what is known as a TAN, i.e. for single use. The patient can notify a doctor, for example, of such a TAN by telephone so that the doctor is provided with access to data objects belonging to the patient.

Hence, within one month, the doctor now has the opportunity five times to open a session on the information system, within which he can merely read the record of the patient. Write access to the record of the patent or an attempt to allocate rights are rejected by the information system. When the time interval has expired, in the same way as after the fifth use, the doctor is no longer able to open a session using the key pair $K_p$ during authentication with the information system.

A further practical potential application is the introduction of an "emergency chip card", in which case, in FIG. 1, for example, a single-use key pair set $K_3(210)$ and a cipher 216, $C\_G_0\_O_3$ are used. This emergency chip card is constantly carried by a person and, in an emergency, allows a treating doctor, for example, such as an emergency doctor, to access the patient record precisely once in situations in which the person himself is no longer capable of allowing username/password access to his record. Following this single access, this chip card is no longer valid—the relevant cipher 216 is blocked for further access or deleted. Nevertheless, the card of the patient can be "reactivated" again at any time when the patient so desires, by re-enabling the relevant cipher associated with the card for fresh "single" access.

The general formulation of the classification features for the validity of key pairs allows diverse further applications of key pair dependencies for implementing multiple key pairs.

Figure 2:
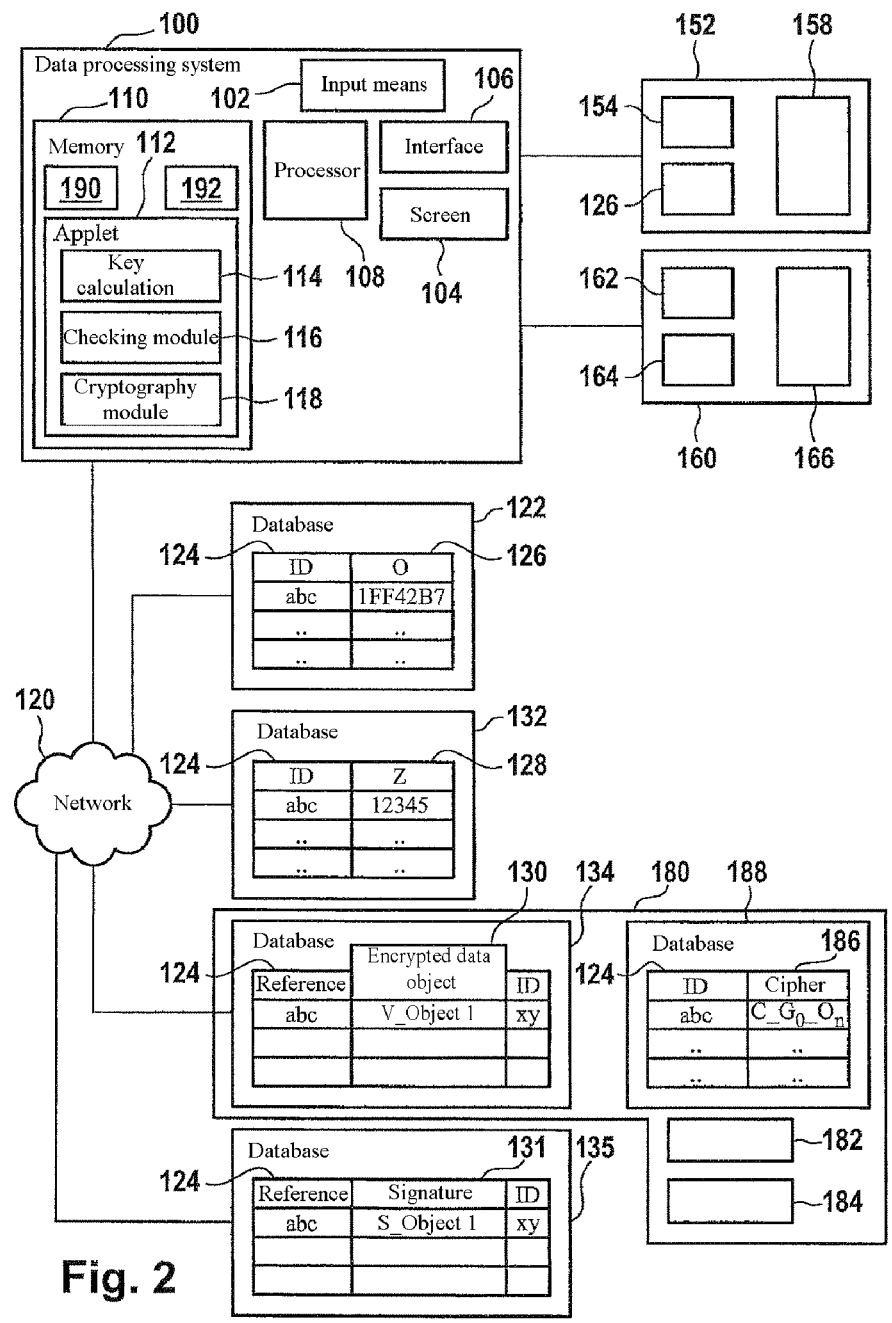
FIG. 2 shows a block diagram of a data processing system.

FIG. 2 shows a data processing system 100. The data processing system comprises input means 102, such as a keyboard, a mouse, a pinpad, means for capturing biometric features, such as a fingerprint scanner or an iris scanner. In addition, the data processing system 100 comprises a screen 104 and also an interface 106, which can be used, by way of example, for communication with a network 120, such as the Internet. In addition, the data processing system 100 comprises a processor 108 which is designed to execute executable instructions for performing method steps. These instructions are held in a memory 110 in the form of an applet 112, for example.

By way of example, the data processing system 100 can be used to generate asymmetric cryptographical key pairs and to subsequently encrypt and decrypt data objects and also to generate and verify digital signatures and for further cryptographical operations. This first of all requires calculation of key pairs, which can be done using the module 114 of the applet 112, for example. In order to calculate keys, the module 114 is used to proceed as follows: the input means 102 are first of all used to obtain an arbitrarily selectable user identifier from a user. From the user identifier, a private key is then calculated, the calculation involving the use of a random value, which is generated by the data processing system 100, and the user identifier. In this case, it is possible for additional parameters to have to be published at the same time in order to use the private key in cryptographical applications, in order to use the private key for performing cryptographical operations.

As already noted above, it is necessary, in the case of elliptic curves, also to provide the domain parameters for the elliptic curve in addition to the second private and public keys, which, in combination with the second private and public keys, makes it possible to apply cryptographical operations. Similarly, it is true for RSA that the natural number n needs to be published at the same time in order to be able to perform cryptographical operations.

Following calculation of the private key, the key is checked by means of the checking module 116. This check is used to check the admissibility of the private key, namely whether the generated key satisfies various security aspects.

By way of example, in the case of elliptic curves, the public key is calculated from the private key by multiplying a curve point on an elliptic curve by the private key. In this case, the admissibility check on the private key involves checking whether the private key is greater than 1 and less than the order of the elliptic curve, with the random value and the private and public keys being admissible if this check condition is satisfied. If this is not the case, however, a new private key and consequently also a new public key need to be calculated by selecting a new random value and repeating the method for key calculation using the module 114 and also the method for checking the generated keys using the module 116.

The random value used for key calculation is then stored in a database 132 and possibly encrypted. By way of example, this is done such that an explicit user identification is allocated for the relevant user, this user identification 124 being allocated the previously generated random value 128 in a table in the database 132. In the present example from FIG. 2, the user identifier "abc" has the associated random value Z with the value "12345". As already mentioned above, the random value is in this case preferably stored in the database 132 in encrypted form in order to reliably prevent dictionary attacks on the private key.

It is subsequently assumed that a database 134 likewise stores a data object 130 in encrypted form in association with the user identification 124, the user identification 124 being used as a reference in this case. An identifier ID "xy" is used as an access key for the data object 130. In this case, the data object 130 is encrypted with the public key 126, which is stored in a database 122. By way of example, the user identification "abc" has the associated public key "1FF42B7" in the database 122. So as now to decrypt the data object 130, an appropriate user needs to be in possession of the private key, which forms an asymmetric cryptographical key pair together with the public key 126. In a simplest case, the user has a chip card 152 which contains not only the public key 126 but also the private key 154. When the user inserts the chip card 152 into an appropriate card reader in the data processing system 100, the processor 108 of the data processing system 100 is then able to perform a decryption process on the encrypted data object 130 by retrieving the encrypted data object 130 from the database 134 via the network 120. Furthermore, it is possible for a signature 131 S_Object1 for the data object to be stored in a database 135 in addition. In this case, the data object is signed with the secret key 154, which is associated with the public key 126. The signature is accordingly verified with the public key 126.

In this case, the database 135 may be part of the database 134, or vice versa.

An alternative decryption process can be effected by using the username/password method described above by generating the secret key 154 from the password or, generally, from the "user identifier".

At this juncture, it should be noted that the arbitrarily selectable user identifier which is input into the data processing system 100 using the input means 102 may be, by way of example, a number combination, a number/letter combination or else a biometric feature. By way of example, when a biometric feature is used, the biometric data can be used to explicitly calculate a bit sequence which can then be used as a user identifier in the key calculation using the module 114.

In addition, it should be noted that, particularly in the case of the encryption and decryption of medical data objects by the data processing system 100, the procedure is as follows, for example: the interface 106 is used to receive a medical data object, for example, from an imaging medical instrument such as an x-ray unit. X-ray data are typically image data which represent extensive volumes of data. The data processing system generates a random symmetric key which is used to encrypt these medical x-ray data. Next, these encrypted data are stored on the database 134 in association with the explicit user identification 124. The generated symmetric key is then encrypted with the public key 126. This thus encrypted symmetric key is likewise stored on the database 134 in association with the user identification 124 and the encrypted data.

For the purposes of decryption, the encrypted symmetric key is then decrypted using the cryptography module 118 by generating the relevant private key using the user identifier as described above and using it for the decryption. The symmetric key obtained in this manner can then be used to decrypt the encrypted data object 130.

Preferably, data objects 130 are stored in the database 134 in individually encrypted form in each case. Even when there is a set of semantically associated data objects, each individual data object is preferably stored in the database 134 in independently encrypted form, so that, in the event of a single data object being retrieved, this encrypted data object 130 is transmitted to the data processing system 100, and it is then decrypted therein. If, in contrast to this, the decryption for semantically associated data objects, which would be combined in a single data object, encrypted and stored, were to be performed in the database for reasons of minimizing the volume of data to be transported, the operator would have access to the decrypted data objects. By contrast, the procedure described above has the advantage that at no time is the database 134, or the operator thereof, provided with access to decrypted keys or data objects.

A third alternative for decrypting the encrypted data object 130 can be found in the option for the username/password method described above ultimately not to provide the private key 154 and the public key 126, but rather to provide a private key 190 and a public key 192, which is kept available in the memory 110 following the performance of the username/password method. In this case, the secret key 190 is associated with a cipher 186 which is stored in a database 188 in combination with the user identifier 124. By retrieving the cipher 186, the data processing system 100 is now able to use the cryptography module 118 to decrypt the cipher 186 using the private key 190. This results in the private key $G_0$, which corresponds to the key 154. A decryption process for the encrypted data object 130 can then again be performed using the cryptography module 118.

Optionally, the databases 134 and 188 are managed in a separate information system, i.e. a separate data processing system 180. This data processing system 180 has an access control which is implemented using the processor 184 in the form of a module 182. By way of example, this access control first of all requires authentication of the data processing system 100 to the data processing system 180. Only when the data processing system 100 has identified itself to the data processing system 180 as an authorized doctor information system, for example, is the data processing system 100 provided with read or write access to the databases 134 and 188.

In addition, such an access control, as already mentioned, may comprise a control in respect of the validity of the ciphers 186 on the basis of time interval, on the basis of number of uses or on the basis of the nature of use.

The database 135 may also be part of the information system 180. The databases 122 and 132 do not necessarily have to be external databases, but rather may likewise be integrated in the information system 180.

The data processing system 100 is also designed to provide asymmetrical cryptographical key pairs and to use them for encryption and decryption processes for data objects. It will subsequently be assumed, without restricting the general nature, that, by way of example, a user is in possession of a chip card 152 which stores the private key 154 and the public key 126. These two keys 154 and 126 in this case form an asymmetric cryptographical key pair. A data object can be encrypted using the public key 126. As already mentioned above, this results in the encrypted data object 130, which is stored in the database 134 in an association together with the explicit user identification 124.

A decryption process can in turn be performed using the secret key 154, the decryption being performed either by the cryptography module 118 of the data processing system 100 or else by the processor 158 of the chip card 152 itself if said processor has a high performance capability.

If the aim is now to provide a further asymmetric cryptographical key pair for encryption and decryption processes, there is an opportunity here firstly to use an additional chip card 160 which has a new private key 162 and a new public key 164, or else there is secondly the opportunity for a user to use the username/password method to choose himself a new password, that is to say a new user identifier, from which a corresponding private key 190 and public key 192 are then generated. In respect of the chip card 160, it is noted that this may likewise have a processor 166 which can be used to perform encryption and/or decryption processes of any kind.

In the former case, the scenario could be that a user of the chip card 152 wishes to have his chip card replaced by a new chip card 160, or, besides the chip card 152, wishes to use an additional chip card 160 to perform encryption and decryption processes for data objects. In this case, it is assumed that, as already mentioned, the chip card 160 already contains a new private key 162 and a new public key 164. To "activate" the chip card 160, the chip cards 152 and 160 are first of all inserted into an appropriate reader in the data processing system 100 in an order indicated by the data processing system 100 by means of the screen 104, or else it is possible for the data processing system 100 to be capable of reading both chip cards 152 and 160 simultaneously. It is subsequently assumed that simultaneous access to the chip cards 152 and 160 is possible. When a user has inserted the two chips cards 152 and 160 into appropriate readers in the data processing system 100, the data processing system 100 reads the private key 154 from the chip card 152. The private key 154 is then encrypted with the public key 164 from the new chip card 160 and stored in the database 188 as a cipher 186. The new chip card 160 is then deemed to have been activated.

However, this procedure is performed in this form only if the private key 154 is the counterpart of that public key 126 which is intended to be used to encrypt all the data objects of a user. If, by contrast, the key pair 154/126 is a key pair which does not allow direct decryption of encrypted data objects 130, it is first of all necessary to read an appropriate cipher 186 associated with the key pairs 154/126 by accessing the database 188 and to decrypt the cipher to obtain the key 154 $G_0$, so as then to encrypt $G_0$ with the new public key 164 and to store it in the database 188 as a new cipher 186.

If a user now wishes to use an additional username/password combination for the data decryption, he first of all needs to identify himself to the data processing system 100 with an appropriate user identification. An arbitrarily selectable user identifier is then input, from which the data processing system then calculates the private key with the module 114. This key calculation is in turn performed using a random value 128 which the data processing system 100 selects at random for this purpose. The random value is then stored in the database 132, preferably in encrypted form, in combination with the user identification 124. The key calculation module 114 is used to perform further calculation of the public key 192 from the private key 190 which has just been generated.

In order to "activate" the new key pair 190/192, the user then needs to insert his chip card 152 into an appropriate reader in the data processing system 100. The data processing system reads the secret key 154 from the chip card 152 and encrypts the private key 154 with the public key 192. This in turn produces a cipher which is stored in the database 188 in association with the user identifier 124.

If, by contrast, the chip card 152 does not have the private key $G_0$ available, this private key $G_0$ needs to be obtained in a different way. By way of example, this can again be done by virtue of the user inputting an "old" user identifier/password combination in the data processing system 100, the data processing system 100 reading an appropriate associated cipher 186 from the database 188 and decrypting $G_0$ so as then to generate a new cipher 186 with the public key 192 from the new username/password combination.

Figure 3:
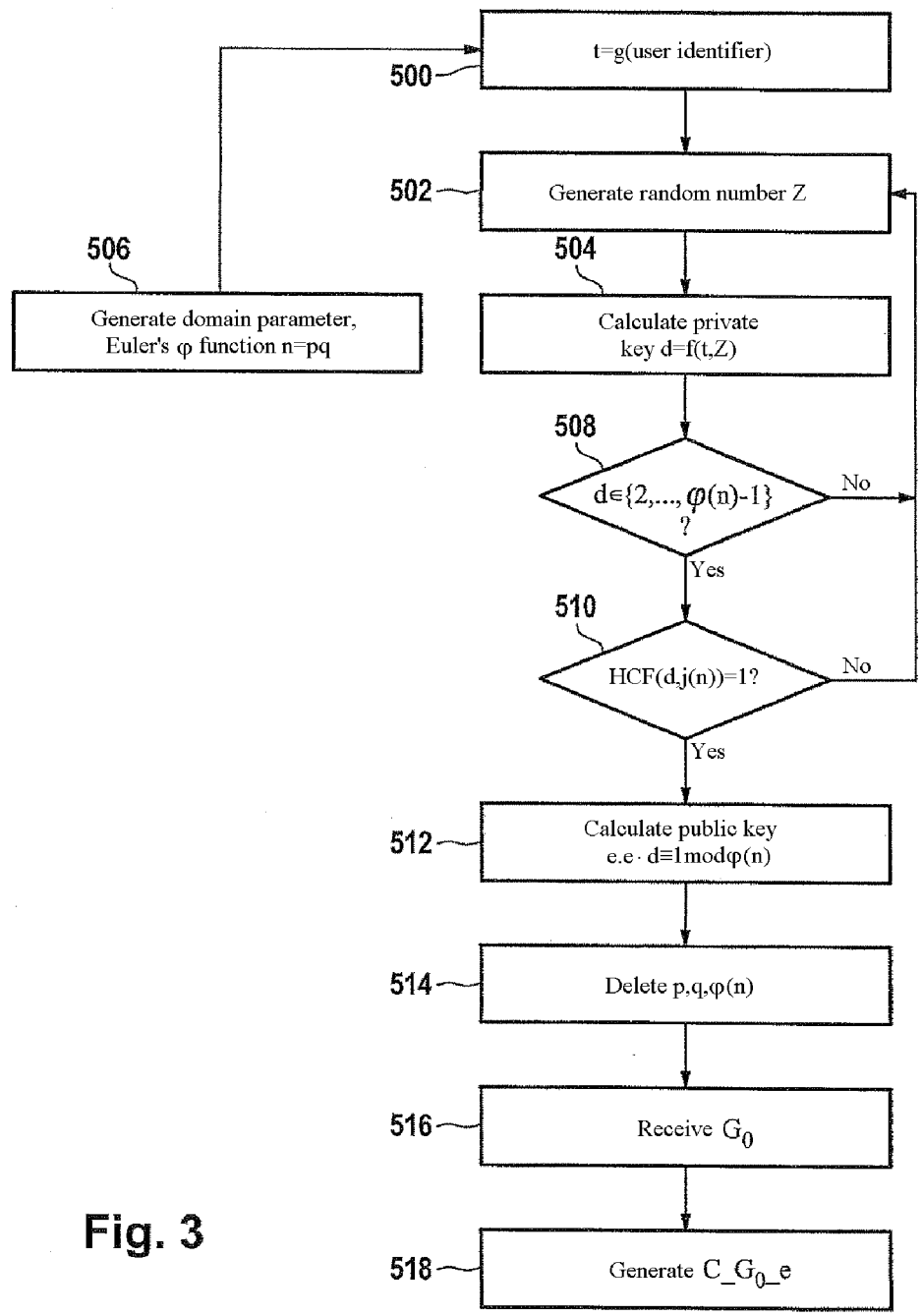
FIG. 3 shows a flowchart for a method for the asymmetric encryption of data.

FIG. 3 shows a flowchart for a method for calculating an asymmetric key pair and an appropriate cipher on the basis of the RSA method. The method starts with step 506, in which two prime numbers p and q are selected according to the current security requirements for RSA. The two numbers are multiplied by one another and the result is called n.

Euler's $\phi$ function is then applied to n, so that the value $\phi(n)$ is obtained.

In the next step 500, a user identifier is received, to which the function g is applied, or the function value g (user identifier) is received directly. This is followed by step 502, in which a random value is generated. By applying the function f to the random value and g (user identifier), a candidate for the private key d is calculated in step 504.

In step 508, an admissibility check is performed, the admissibility check taking place on multiple levels in the case of the RSA method. Thus, step 508 first of all checks whether d is in the range [2, $\phi(n)-1$].

If the result of the checking step 508 is that the check condition is not satisfied, the method returns to step 502, where a new random value is generated. This is then again followed by step 504 with the fresh calculation of a candidate for the private key d using the new random value and the fresh check on the candidate d in step 508. This loop comprising steps 502, 504 and 508 is repeated until the check condition in step 508 is satisfied. Only then does the method continue with step 510.

Step 510 comprises a further checking step, namely whether $\phi(n)$ and the key candidate d do not have a common denominator, i.e. HCF(d, $\phi(n)$)=1. If this is not the case, the method returns to step 502 again and a new random value is generated, followed by steps 504, 508, 510. This loop comprising steps 502, 504, 508 and 510 is also repeated until the check condition in step 510 is satisfied. Only then does the method continue with step 512. Preferably, the checking step 508 is performed before the checking step 510, since the computation complexity for step 508 is substantially lower than the computation complexity for step 510.

Finally, the public key e is calculated in step 512, so that e satisfies the congruence relationship e·d≡1 mod $\phi(n)$, where e∈[1, $\phi(n)-1$]. In order to use both keys in cryptographical methods, it is also necessary for n to be disclosed.

In the concluding step 514, the numbers p, q and $\phi(n)$ are discarded, i.e. deleted.

Besides checking steps 508 and 510, it is possible to use further checking steps so as to increase the security of the generated asymmetric key pair.

Step 514 is followed by step 516, in which the private key $G_0$ is received. In this case, this private key $G_0$ is part of the asymmetric cryptographical key pair, the public key from which is used to encrypt data objects of a user. In the subsequent step 518, a cipher is generated, in which $G_0$ is encrypted with the public key e calculated in step 512.

Figure 4:
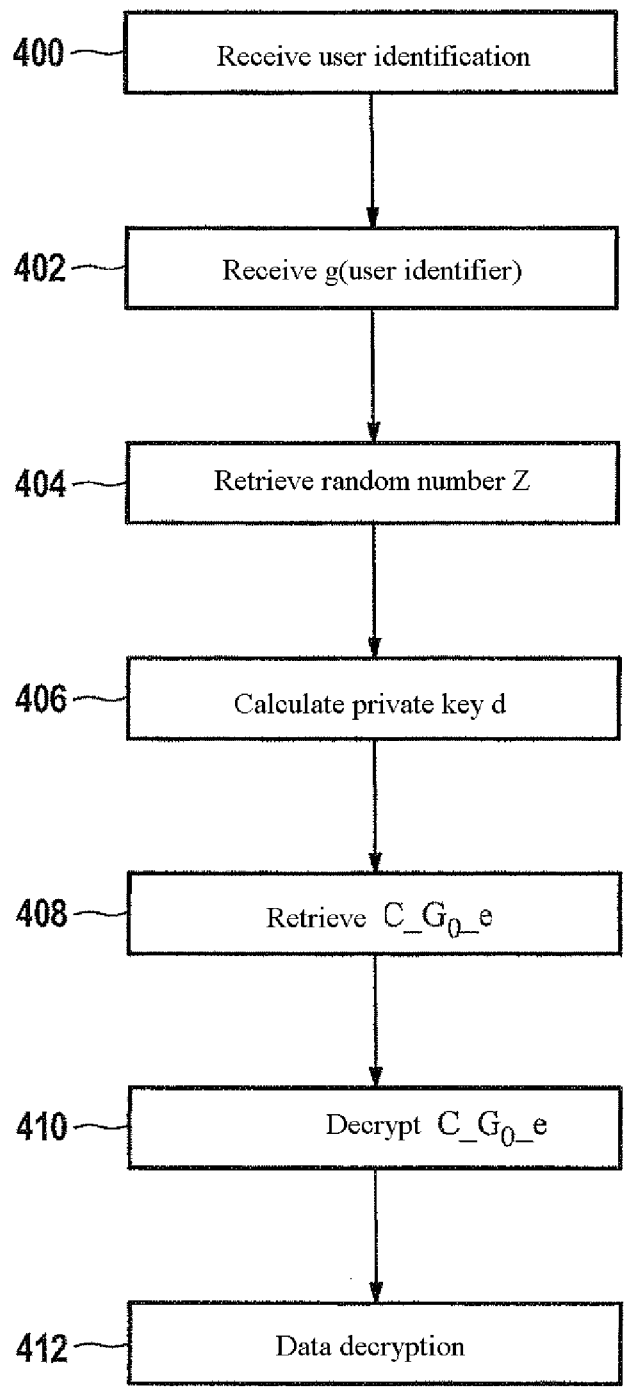
FIG. 4 shows a further flowchart for a method for the decryption of data using an asymmetric key method.

FIG. 4 shows a flowchart for a method for decrypting data. In this case, it is assumed that the data have been encrypted with a public key $O_0$, the public key $O_0$ being part of an asymmetric cryptographical key pair $K_0$, where $K_0$ has not only the public key $O_0$ but also the private key $G_0$.

In step 400, a user identification is received. In addition, in step 402, the output value for the function g applied to the user identifier is received, where g may be in the form of a HASH function for application to the user identifier, and then in step 404 the user identification received in step 400 is used to retrieve a random number Z from an appropriate database. This random number is firmly linked to the user identification. In step 406, a private key d is calculated, with the output value for the step 402 and the random number Z from step 404 being used in this calculation.

In step 408, the cipher C_$G_0$_e is retrieved from a data server which preferably also contains the data objects to be decrypted. This cipher retrieved in step 408 has the private key $G_0$ in encrypted form, encrypted with the public key e, the public key e and the private key d forming an asymmetric cryptographical key pair.

The cipher is then decrypted in step 410, and this produces the private key $G_0$. Finally, $G_0$ is used in step 412 for data decryption.

List of Reference Symbols

100 Data processing system
102 Input means
104 Screen
106 Interface
108 Processor
110 Memory
112 Applet
114 Module
116 Module 118 Module
120 Network
122 Database
124 User identification
126 Public key
128 Random number
130 Encrypted data object
132 Database
134 Database
152 Chip card
154 Private key
158 Processor
160 Chip card
162 Private key
164 Public key
166 Processor
180 Data processing system
182 Module
184 Processor
188 Database
186 Cipher
135 Database
131 Signature
200 Key pairs
202 Ciphers
204 Encrypted data objects
206 Key pair
208 Key pair
210 Key pair
212 Cipher
214 Cipher
216 Cipher
218 Key pair

What is claimed is:

1. A method for generating a second asymmetric cryptographical key pair, wherein a first private key ($G_0$) forms a first asymmetric cryptographical key pair ($K_0$) together with a first public key ($O_0$), wherein the method comprises the following steps:
receiving a user identifier,
calculating a second private key ($G_1$), wherein a random value (z) and the user identifier are used in the calculation,
calculating a second public key ($O_1$) from the second private key using an asymmetric cryptographical key generation method, wherein the second private key and the second public key form the second asymmetric cryptographical key pair ($K_1$),
performing an admissibility check on the second private key using a check condition, wherein the check condition comprises the usability of the second private key for generating the second public key from the second private key using an asymmetric cryptographical key generation method,
calculating the second public key from the second private key if the check condition is satisfied,
calculating the second private key with a new random value and repeating the step of performing an admissibility check if the check condition is not satisfied,
generating a first cipher ($C\_G_0\_O_1$) by encrypting the first private key ($G_0$) with the second public key ($O_1$),
storing the first cipher ($C\_G_0\_O_1$),
storing the random value in a database.

2. The method as claimed in claim 1, wherein the step of calculating the second private key comprises the application of a one-way function f to the random value and of a function g, wherein the function g is applied to the user identifier.

3. The method as claimed in claim 2, wherein the function g is a further one-way function.

4. The method as claimed in claim 3, wherein the function f and/or the function g is/are a cryptographical hash function.

5. The method as claimed in claim 1, wherein the asymmetric cryptographical key generation method for calculating the second public key is a method on elliptic curves, wherein the second public key is calculated by multiplying the second private key by a curve point on an elliptic curve.

6. The method as claimed in claim 1, wherein the asymmetric cryptographical key generation method for calculating the second public key is a method on elliptic curves, wherein the second public key is calculated by multiplying the second private key by a curve point on an elliptic curve, wherein the check condition is the condition that the second private key is greater than 1 and less than the order of the elliptic curve.

7. The method as claimed in claim 6, wherein the check condition is the condition that the bit length of the random value is greater than or equal to the bit length of the order of the elliptic curve.

8. The method as claimed in claim 6, wherein the check condition is the condition that the random value is chosen such that the value of the generated second private key is less than the order of the elliptic curve.

9. The method as claimed in claim 1, wherein the asymmetric cryptographical key generation method for calculating the second public key is an RSA method.

10. The method as claimed in claim 1, wherein the asymmetric cryptographical key generation method for calculating the second public key is an RSA method, wherein the check condition is the condition that Euler's $\phi$ function for the modulus n that is used for the RSA key generation method and the second private key do not have a common denominator.

11. The method as claimed in claim 10, wherein the check condition is also the condition that the second private key has a value between 2 and the value of the $\phi$ function of the modulus n used for the RSA key generation method minus 1.

12. The method as claimed in claim 1, wherein the method is produced by an applet or a browser plug-in or is an independent application which runs on a computer at a trustworthy station or is an embedded application which runs in a protected hardware module.

13. The method as claimed in claim 1, wherein the method also comprises:
receiving a third private key ($G_2$), wherein the third private key forms a third asymmetric cryptographical key pair ($K_2$) together with a third public key ($O_2$),
receiving a second cipher ($C\_G_0\_O_2$), wherein the second cipher comprises the first private key ($G_0$) following encryption with the third public key ($O_2$),
decrypting the second cipher with the third private key ($G_2$) to obtain a first private key ($G_0$).

14. The method as claimed in claim 13, wherein receiving the third private key comprises the following steps:
receiving a further user identifier,
receiving a further random value, wherein the further random value is associated with the further user identifier,
calculating the third private key ($G_2$), wherein the further random value and the further user identifier are used in the calculation.

15. The method as claimed in claim 13, wherein the third private key is received from a tangible portable data storage medium.

16. The method as claimed in claim 13, also having the step of authentication to the database, wherein the second cipher is received from the database following successful authentication.

17. The method as claimed in claim 1, also having the step of generation of a fourth asymmetric cryptographical key pair, wherein a fourth private key ($G_3$) forms the fourth asymmetric cryptographical key pair ($K_3$) together with a fourth public key ($O_3$), wherein the method comprises the following steps:
- receiving the fourth public key ($G_3$),
- generating a fourth cipher ($C\_G_0\_O_3$) by encrypting the first private key ($G_0$) with the fourth public key ($O_3$),
- storing the fourth cipher.

18. The method as claimed in claim 1, wherein the method is performed on a tangible portable data storage medium.

19. The method of claim 1, comprising a tangible computer readable medium having instructions which can be executed by a processor for the purpose of performing the method steps.

\* \* \* \* \*